United States Patent
Löhle

(10) Patent No.: US 12,399,815 B2
(45) Date of Patent: Aug. 26, 2025

(54) METHOD AND MEMORY CONTROLLER FOR OPTIMIZING AN ACCESS SCHEME FOR MEMORY ACCESS OF A HOST TO A DATA MEMORY

(71) Applicant: Hyperstone GmbH, Constance (DE)

(72) Inventor: Christian Löhle, Constance (DE)

(73) Assignee: HYPERSTONE GMBH (DE)

( * ) Notice: Subject to any disclaimer, the term of this patent is extended or adjusted under 35 U.S.C. 154(b) by 72 days.

(21) Appl. No.: 18/499,525

(22) Filed: Nov. 1, 2023

(65) Prior Publication Data

US 2024/0403208 A1    Dec. 5, 2024

(30) Foreign Application Priority Data

Jun. 2, 2023   (DE) .................. 10 2023 114 606.8

(51) Int. Cl.
     *G06F 12/02*      (2006.01)

(52) U.S. Cl.
     CPC .............................. *G06F 12/0246* (2013.01)

(58) Field of Classification Search
     CPC .............................. G06F 12/02; G06F 12/0246
     See application file for complete search history.

(56) References Cited

U.S. PATENT DOCUMENTS

| | | | | |
|---|---|---|---|---|
| 11,586,385 B1* | 2/2023 | Lercari | ............... | G06F 12/0246 |
| 2010/0082886 A1* | 4/2010 | Kwon | ................ | G06F 12/0246 |
| | | | | 711/E12.008 |
| 2014/0082322 A1* | 3/2014 | Loh | ..................... | G06F 12/0223 |
| | | | | 711/E12.001 |
| 2015/0186052 A1 | 7/2015 | Lee et al. | | |
| 2019/0012099 A1* | 1/2019 | Mulani | ................ | G06F 3/0619 |
| 2021/0173777 A1* | 6/2021 | Zhang | ................ | G06F 12/0215 |
| 2022/0300418 A1* | 9/2022 | Baugh | ................ | G06F 12/0284 |
| 2023/0120184 A1* | 4/2023 | Kachare | ................ | G06F 3/061 |
| | | | | 711/154 |

OTHER PUBLICATIONS

T. Elarabi, B. Sharma, K. Pahwa and V. Deep, "Big data analytics concepts and management techniques," 2016 International Conference on Inventive Computation Technologies (ICICT), Coimbatore, India, 2016, pp. 1-6.*

* cited by examiner

*Primary Examiner* — Pierre Michel Bataille
(74) *Attorney, Agent, or Firm* — Jaffery Watson Hamilton & DeSanctis LLP

(57) ABSTRACT

Systems and methods are provided for optimizing an access scheme for memory accesses by a host to a data memory managed by a memory controller with one or more memory media. An access scenario communicated by the host is received by the memory controller, An optimized access scheme is determined that defines a specific sequence of physical memory accesses to the data memory to be executed by the memory controller to implement the access scenario. The optimization shortens a total access time for the access scenario, by modifying a memory access by means of a shift of a respective physical memory area to be addressed thereby in relation to an address mapping and/or by means of a temporal advancement of the respective memory access. Access information defining the optimized access scheme is then stored to allow it to subsequently be automatically executed in response to a call.

36 Claims, 5 Drawing Sheets

METHOD AND MEMORY CONTROLLER FOR OPTIMIZING AN ACCESS SCHEME FOR MEMORY ACCESS OF A HOST TO A DATA MEMORY

CROSS REFERENCE TO RELATED APPLICATIONS

The present application claims priority to German Patent Application No. 10 2023 114 608.8, filed Jun. 2, 2023. The entirety of the aforementioned patent application is hereby incorporated by reference in its entirety for all purpose.

FIELD

The present invention relates to a method for determining an optimized access scheme that corresponds to a specific access scenario for a host accessing a data memory via a memory controller, as well as a memory controller set up to carry out the method and a computer program or computer program product configured for this purpose.

DESCRIPTION OF THE RELATED ART

Communication between a host and a memory controller is primarily via accesses, in particular read accesses, where the host wants to read data from the data memory (such as data previously written by the same host), or write accesses, where the host wants to write new data into the data memory. To accomplish this, it initiates access to the memory controller, which includes at least one memory address and access size, before the actual data follows, be it data transmitted from the host to the memory controller during write access or data transmitted from memory to host during read access. The initiated accesses are then served by the memory controller, namely either data to be written transmitted by the host is stored in the data memory so that it is available at the specified memory address for future read access, or data to be read is read from the data memory and transmitted to the host.

When a host accesses a data memory assigned to it, a distinction can be made between so-called sequential access, in which consecutive accesses to physically consecutive memory areas in the data memory take place, and random access, in which the memory areas affected by the successive accesses can be located anywhere in the data memory relative to one another. In many cases, such as with hard disk memory and flash memory, random accesses are generally less performant than sequential accesses.

Problems with Random Access

To illustrate the problems with random access and the associated performance losses (synonymous with suboptimal individual access times) compared to sequential access, some causes for access performance limitations are explained below. In the headings that introduce the descriptions of the respective causes, a main aspect of the respective cause is mentioned in brackets.

1. Physical Properties of Memory Media (Positioning)

With some memory media that work sequentially on their own, achievable access times (at least on average) depend heavily on the access pattern due to the underlying physical properties of these memory media. An example is a hard disk whose read head has to be moved between successive accesses if the associated data is on different tracks (read access) or is to be written thereon (write access). If the accesses are random, the reading head has to be moved on average (expected value) over half the memory medium in a time-consuming manner until it is in the desired position.

2. Caching of Expected Access Data (Predictability)

A memory controller can anticipate upcoming read accesses by preemptively loading the data to be read from the data memory and storing it in a separate memory (or one or more registers) of the memory controller. This method is often referred to as "Read Ahead". In the case of a usage scenario in which data is requested in bursts, this can significantly increase performance. In this case, the memory controller uses the actual idle times (in which the host, for example, must first process data that has already been received before requesting new ones) in order to reduce the memory controller's workload required for later actual read accesses, at least in the case of correctly predicted read accesses.

In the case of a sequential read access to the (logical) memory address i, the contents of the memory areas accessible under the (logical) memory addresses i+1 to i+n are then also preloaded by the memory controller, although initially only the actually requested access to the memory address i is served. If there is then a subsequent access to the memory address i+1 or subsequent memory addresses, this subsequent access can also be served directly by the memory controller without the data first having to be read out of the data memory, while otherwise, that is, if unanticipated access follows, the preloaded data will be discarded in the foreseeable future, so the anticipatory load was to no avail.

3. Speeding-Up by Interleaving Memory Media (Predictability)

In many cases, a single memory controller can manage multiple memory media of a data memory. If accesses are then optimally distributed and the data from accesses that are expected to be connected are stored alternately on the memory media (interleaving), the performance and often also the robustness to errors can be significantly increased. In the case of a random access pattern, on the other hand, there is usually a significant probability that the same memory medium will have to be used several times in a row and the performance will therefore already and only be limited by this memory medium.

4. Resolution of Logical in Physical Address Areas (Access Size)

If the memory controller maps from logical to physical addresses, this mapping must take place for each new access, while this is only necessary once per access in the case of sequential access, since the data from the successive accesses is consecutively written to or read from the physical memory across all accesses or, in the case of constant distances between the memory areas (for example, due to said interleaving), at least no complete address mapping is required.

5. Additional Effort Due to Interaction With the Host (Number of Accesses Per Time Unit)

In the case of (small) random accesses, the overhead (usually the same for each access operation) for interacting with the host over the total runtime is more significant than in the case of larger random accesses or sequential accesses. The effort can arise in particular when host requests are answered in accordance with the protocol and/or the relevant information on the requested access (namely access type, (logical) address, access size) has to be extracted from the request.

SUMMARY

Systems and methods are described for optimizing an access scheme for memory accesses by a host to a data memory managed by a memory controller with one or more memory media. It is an object of the present invention to solve at least one of the above challenges (positioning, predictability, access size and accesses per time unit) in order to achieve a significant increase in performance for accesses by a host to a data memory using a memory controller in certain applications.

This object is achieved according to the teaching of the independent claims. Various embodiments and developments of the invention are the subject matter of the dependent claims.

A first aspect of the present solution relates to a method for optimizing an access scheme for memory accesses by a host to a memory controller-managed, in particular non-volatile, data memory with one or more memory media, in particular flash memory, wherein the method is carried out by the memory controller and comprises:

(i) receiving an access scenario communicated by the host that defines a particular sequence of accesses by the host to the data memory to be performed by using the memory controller;

(ii) optimizing an access scheme corresponding to the received access scenario, which defines a specific sequence of physical memory accesses to the data memory to be executed by the memory controller to implement the access scenario, wherein the optimization to shorten a total access time for the access scenario comprises modifying at least one of the memory accesses by shifting a respective physical memory area to be addressed thereby in relation to an address mapping and/or by means of a temporal advancement of the respective memory access; and (iii) storing an access information defining the optimized access scheme, in particular in the memory controller itself or in a memory area of the data memory assigned thereto, so that the optimized access scheme can subsequently be activated by a call in such a way that it is automatically performed in reaction to the call according to the stored access information.

Receiving the access scenario can include, in particular, executing the access scenario, wherein the host transmits the accesses defined in the access scenario according to the time sequence defined for this purpose to the memory controller, which then uses an initial, corresponding access scheme for executing the corresponding physical memory accesses. This initial access scenario is then subsequently subjected to the aforementioned optimization by the memory controller. In addition or as an alternative, it is also possible for the host to transmit the access scenario only as information and for the memory controller to carry out the optimization based thereon, without an actual physical memory access being required for this purpose in accordance with the initial access scheme.

In the method, for a given access scenario communicated by the host to the memory controller, an optimization is determined to achieve a shorter total access time for the access scenario by using the degrees of freedom that are still available when determining the access scheme, even with a fixed access scenario, with regard to address mapping and timing of the physical accesses, in order to achieve an increase in performance (on the basis of reduced individual access times). In particular, the optimization can go so far that the performance of a sequential access is achieved with an access size that corresponds to the total access size of the access scenario cumulated over the individual accesses. The increase in performance actually achieved depends on the specific access scenario.

In addition to an increase in performance, when using the method, compared to a corresponding execution of the same access scenario without using the method, depending on the access scenario, the following can be achieved: (i) a reduction in the general management effort by the memory controller for the execution of the access scenario, (ii) an extension of the expected or actual lifetime of the memory medium and/or (iii) a reduction in power consumption of the memory controller required to execute the access scenario.

In cases (i) and (ii), the improvement can be based in particular on the fact that, in the case of a known access scenario with an access scheme optimized for it, read-ahead operations that subsequently prove to be unnecessary can largely be avoided. In these cases, the garbage collection that is otherwise regularly planned, in particular with flash memory controllers, can usually be greatly reduced or even avoided, so that overall number of physical accesses required to manage the memory can be reduced.

In case (iii) in particular, the power consumption must be taken into account for the entire access process. Although it is still possible that the power consumption is briefly higher at some point during the access, the energy savings that can be achieved by shortening the access process will usually dominate, so that the power consumption is reduced on average.

The memory controller and the entire memory system can continue to be usable outside of the access scenario, in particular in such a way that during normal operation of the memory controller (namely outside of the execution of the method) its behavior hardly changes (possibly to keep memory for write accesses of the access scenario) or does not change at all.

The term "host" as used herein is specifically any device or system, such as a computer or an embedded system, on which an application can be executed, which provides the actual function of the device or system. To do this, the host needs access to a data memory, which it writes to and/or reads from to run the application.

The term "data memory" or "memory" for short, as used herein, means an information storage device for storing and reading data therefrom. Insofar as the data represent one or more computer programs, the memory can in particular also serve as a program memory. The memory may include one or more memory media. In particular, non-volatile memory, such as flash memory with one or more flash memory chips or embedded flash memory arrays serving as memory media, magnetic disk drives with one or more disks serving as memory media, or magnetic tape drives with one or more magnetic tapes serving as memory media are all data memory devices as defined herein.

The term "memory controller" or "controller" for short, as used herein, means in particular a device, such as an electronic circuit, which controls a data flow between the host and a data memory with one or more memory media which the host can access. The memory controller can in particular be part of a (persistent) data memory. It abstracts properties of the data memory for the host and can, in particular, independently carry out optimizations to increase the performance of the host's accesses.

The term "access time" as used herein means an amount of time the memory controller needs to service each access, namely in the case of write access, the time between receiving the write access request from the host and completing storing the data in the data memory, and in the case of read access, the time between the read access request from the host and completing the transmission of the read data to the host.

The term "access scenario", as used herein, means a specific sequence of accesses to the data memory by the host to be performed using the memory controller. The access scenario can be defined in particular as a sequence of access segments and, if necessary, pauses in between, wherein an access segment defines an access by means of a memory address and an access size (in particular a quantity of the data to be read or written) and, if different types of access are possible, also the type of access (reading, writing). If the memory controller performs address mapping from logical memory addresses to physical memory addresses, the addresses specified in the access segments of the access scenario are normally logical memory addresses, which are mapped to physical memory addresses in the memory controller when the assigned access is executed, in order to be able to address the data memory directly.

The term "access scheme" as used herein is to be understood as meaning a specific sequence of physical memory accesses by the memory controller to the data memory using physical addresses, which sequence is suitable for executing a given access scenario and which, in this sense, corresponds thereto. There can be a plurality of different access schemes for a given access scenario. If no address mapping is provided and thus the access requests transmitted from the host to the memory controller are already defined on the basis of physical memory addresses, the access scenario is also the access scheme, so that the two then coincide.

The term "optimizing the/an access scheme" as used herein is to be understood in particular as indicating the creation of an access scheme that corresponds to a given access scenario and which, when executed, has a higher performance than another access scheme corresponding to the access scenario, which is the starting point for optimization. In cases without address mapping, where the access scenario and an access scheme corresponding thereto coincide, a modification of the access scheme made as part of the optimization results in the same modification of the access scenario.

As possibly used herein, the terms "comprises," "contains," "includes," "is provided with," "has," "with," or any other variant thereof are intended to cover non-exclusive inclusion. For example, a method or a device that comprises or has a list of elements is not necessarily restricted to these elements, but may include other elements that are not expressly listed or that are inherent to such a method or device.

Furthermore, unless expressly stated to the contrary, "or" refers to an inclusive or and not to an exclusive "or". For example, a condition A or B is met by one of the following conditions: A is true (or present) and B is false (or absent), A is false (or absent) and B is true (or present), and both A and B are true (or present).

The terms "a" or "an" as possibly used herein, are defined in the meaning of "one or more". The terms "another" and "a further" and any other variant thereof are to be understood to mean "at least another".

The term "plurality" as possibly used herein is to be understood to mean "two or more".

The terms "first," "second," "third," and similar terms in the specification and claims are used to distinguish between similar or otherwise like-named elements and are not necessarily descriptive of a sequential, spatial, or chronological order. It should be understood that the terms so used are interchangeable under appropriate circumstances, and that the embodiments of the solution described herein may operate in different orders than those described or illustrated herein.

The term "configured" or "set up" to perform a specific function (and respective modifications thereof), possibly used herein, is to be understood to mean that the corresponding device or component thereof is already provided in a design or setting in which it can execute the function or that it is at least settable—namely configurable—so that it can execute the function after corresponding setting. The configuration can take place, for example, via a corresponding setting of parameters of a process course or of switches or the like for activating or deactivating functionalities or settings. In particular, the device can have a plurality of predetermined configurations or operating modes, so that the configuration can be carried out by selecting one of these configurations or operating modes.

BRIEF DESCRIPTION OF THE DRAWINGS

Further advantages, features, and possible applications of the present invention result from the following more detailed description in conjunction with the figures.

In particular.

DETAILED DESCRIPTION

Figure 1:
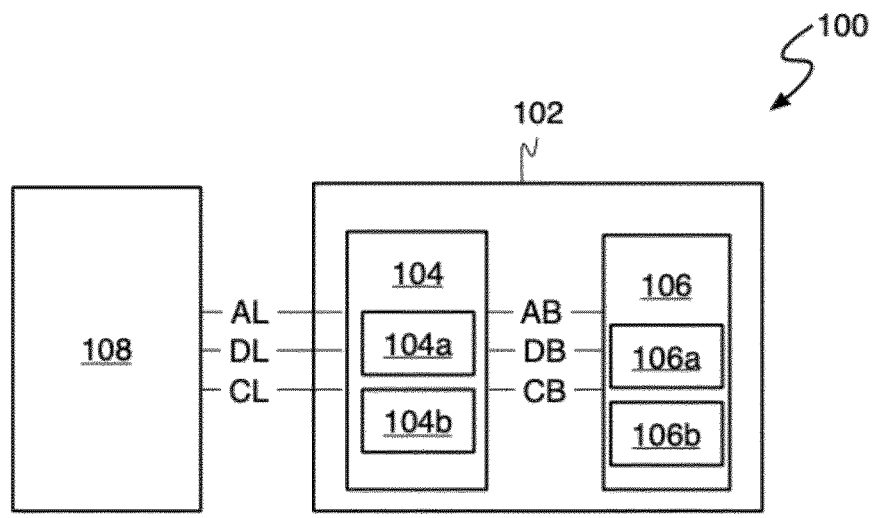
FIG. 1 shows a computer system with a host, a data memory and a memory controller for managing the data memory, according to an exemplary embodiment.

Systems and methods are described for optimizing an access scheme for memory accesses by a host to a data memory managed by a memory controller with one or more memory media. Especially in the case of flash memory, the problem of random access on the physical level does not usually exist, since no positioning of a read head or the like must take place.

In the case of memory media that, on the other hand, have a linear arrangement that is driven by a mechanism (tape, CD, hard drive), the positioning problem is critical. However, also in this case, a mapping from logical to physical addresses is fundamentally possible with a certain predictability of the accesses, so that a logical distance between different addresses is not necessarily involve a physical gap in the linear arrangement of the memory medium.

Such an address mapping could then counteract the poor positioning of the data when accesses are predictable, but would require a memory controller that performs this mapping and uses heuristics to predict accesses.

Exemplary Application Cases of the Method

The method can be used advantageously for those applications in which one or more a priori fixed or little changing access scenarios are used, so that there is a high probability or even certainty that the access scenario will occur again, in particular repeatedly, and the access scheme optimized in this regard can be used for increasing performance during the repetitions.

In the following, some such applications are explained in more detail by way of example and without this being to be understood as a limitation of the method to these use cases:

Boot Process

The access scenarios during the boot process are usually very similar to identical for consecutive executions. Especially with boot processes in the context of firmware or other embedded or industrial systems in which updates occur rather monolithically and in which non-deterministic influences during the boot process (such as through network access) are unlikely, boot processes are often invariable for a given firmware or update status for a concrete system, namely always identical. The method is preferably used immediately after each update in order to generate an optimized corresponding access scheme for the (new) access scenario for the new boot process before the update is subsequently used productively. The access scenario can be communicated to the memory controller in particular by executing a simple boot process after the update (namely by a reset).

Hibernation

Hibernation is a process that allows the host to shut down completely, but then, upon reactivation (usually of a power supply), it restores the state of the host before initiating the deactivation. Typically, a large part of the hibernation process involves writing the contents of a (volatile) working memory to a (non-volatile) memory medium.

Application Start

An application running or capable of running on the host, the execution of which remains the same or changes only at known times, at least in a phased manner, such as at the start or end of the application, can be optimized using the method.

Criteria for Suitable Application Cases

In general, suitable application cases can exist, in particular if they can be classified into at least one of the following three categories, each of which explains why the access scenario is not entirely carried out in relation to a (non-volatile) working memory of the host:

1. The working memory is not (yet) available (boot/hibernation),
2. The effort of preparing the working memory is too complex (application start) and
3. The total size of the access scenario exceeds the size of the (currently free) working memory (application start).

Preferred embodiments of the method are described hereinafter, which in each case, unless expressly excluded or technically impossible, can be combined as desired with one another and with other aspects of the present solution, which will be described in the following.

In some embodiments, an associated logical memory area is specified in the access scenario for the accesses defined therein, which memory area is mapped in the context of an address mapping to a corresponding physical memory area of the data memory, which is defined in the access scheme. These embodiments are particularly suited for use in flash memory controllers where logical to physical address mapping is typically used.

In some such embodiments, the optimization of the access scheme includes modifying the address mapping in such a way that for two or more consecutive accesses in the access scenario, their respective corresponding physical memory areas are combined in such a way that, upon a subsequent activation of the optimized access scheme by means of a sequential memory access, they can be addressed contiguously. In this way, the time advantages that occur with sequential access compared to random access can be used. In particular, the above mentioned "Read-Ahead" approach can thus be used to achieve an average increase in performance through shorter access times.

In particular, according to some of these embodiments, the physical memory areas can be combined in relation to two or more consecutive accesses in the access scenario (namely possibly with a pause, but without further access in between), in which the access size of their respective corresponding physical memory area is the minimum access size (In the case of flash memory, the size of a memory page (page)), while the sum of their access sizes corresponds at least to the minimum access size. Such a merging is possible and advantageous since the associated memory accesses occur directly one after the other, so that a single common memory access that serves all these combined accesses is particularly efficient.

In some embodiments the data memory has at least two memory media, and the accesses in the access scheme that are directly consecutive and to be combined in the access scenario are defined as alternating within the framework of an interleaving between the memory media. In this case, the physical memory areas are combined as part of the optimization of the access scheme in such a way that each subsequent access continues the interleaving from a physical memory location at which the interleaving of the preceding access ends. The advantages of interleaving can thus also be used in combination with those of the aforementioned merging of physical memory areas, in particular with regard to the use of sequential memory accesses for directly consecutive accesses in the access scenario or access scheme.

In some embodiments the access scheme defines two or more physical write accesses. In addition, in this case, the optimization of the access scheme comprises modifying the address mapping in such a way that for at least two of the write accesses their associated physical memory areas are placed in the same memory unit of the data memory, which can be erased contiguously within a single erase access. This is advantageous in particular with regard to data memory types (in particular flash memory) in which writing to a memory area that has already been written to before must be preceded by erasing of this memory area, wherein a minimum erasure access size (such as a block size) for erasure is applicable, which size may be larger than the minimum write access size. The preparation of the data memory for the multiple write accesses defined in the access scheme can thus take place in a time-saving and/or energy-saving manner for at least two of these write accesses by means of a single erase access.

In some embodiments the access scheme defines one or more physical write accesses and the optimization includes modifying the address mapping in such a way that overall, for all these write accesses, a sufficiently large writable (namely free) memory space is reserved for their later execution according to the optimized access scheme. In this way, a prior erasure of the relevant memory area can be dispensed with when executing the access scheme, which in turn can be used to save time and/or energy. In particular, the aforementioned memory area merging can also be advantageously used in this case to enable sequential write accesses to the reserved memory area, with which multiple successive write accesses in the access scenario or access scheme can be served.

In some embodiments the optimization includes a temporal advancement of a second access defined in the access scenario in such a way that, in the context of the optimized access scheme, the beginning of the physical memory access corresponding to the second access is advanced to an execution time for which in the access scenario a pause is provided between a first access preceding the second access and the second access. In particular, in the case of read accesses, a working memory (or register) of the memory controller can be preloaded, in particular until it is full, and the read accesses are answered directly by the host by transmitting the read data requested and already preloaded in the working memory (or register) of the memory controller as soon as the associated access calls are received by the host or are retrieved after activation of the access scheme according to the access information.

In some embodiments the method further comprises, subsequent to storing the access information, activating the access scheme in response to an invocation of the access scenario to execute the access scheme as defined by the access information. The access scenario can thus be triggered simply by its invocation and executed based on the corresponding optimized access scheme represented by the access information, without the host having to individually invoke (again) the accesses defined in the access scenario. In this case, the activation can take place in particular in response to a call for the access scenario received by the host and/or automatically as part of a start-up (such as a boot, in particular after a reset) of the memory controller. It is also conceivable that the memory controller recognizes an access scenario that the host is currently transmitting based on a subset (in particular an initial sequence) of the accesses and/or pauses contained therein and then selects and executes on its own accord the corresponding cached access scheme.

In some embodiments, receiving the access scenario from the host takes place in response to receiving a start signal received by the host. Additionally, receiving the access scenario from the host may be completed in response to receiving an end signal received from the host. The host can thus easily signal the memory controller the period of time in which the method will be executed. In particular, the memory controller is thus informed that the sequence of accesses received from the host in the period of time is to be interpreted as an access scenario (to be trained) for which an optimized access scheme is to be determined by the memory controller according to the method.

In some embodiments the method is defined as an iterative method such that:
(i) in the first iteration the access scenario is received and a first access scheme corresponding thereto and an execution time for its execution are determined;
(ii) in each subsequent iteration:
the access scenario is received again (in the case of an access scenario with variable access parameters, however, possibly with at least partially different access parameters, see below);
the optimization is performed based on the previous access scheme determined in the last previous iteration to determine a current access scheme;
an indicator is determined of a difference between the execution time of the current access scheme and the execution time for the previous access scheme;
the indicator is compared to a defined minimum requirement; and
if the comparison shows that the difference specified by the indicator does not yet meet the minimum requirement, the method proceeds to the next iteration,
otherwise, the current access scheme is set as the optimized access scheme and saved based on the access information.

With the help of this iterative procedure, it can be ensured in particular that the finally determined optimized access scheme meets the specified minimum requirement and not all conceivable optimization options have to be used from the outset in the context of the optimization. If, for example, a modification of the address mapping determined during the iteration is already sufficient to achieve the minimum requirement, other optimizations, such as anticipating accesses, can be dispensed with. Overall, the minimum requirement can thus be met in a particularly efficient manner, which can be used in particular to shorten the optimization period.

In particular, for each iteration, the previous access scheme can be executed as the starting point for the optimization running in this iteration, and its execution time can be measured for use in the above-mentioned comparison.

In some embodiments any variable accesses in the access scenario are recognized for each iteration when it is executed multiple times, as part of the iteration, wherein variable accesses are characterized in that they change while maintaining the same position within the access scenario over different iterations with regard to their access address, their access size and/or the length of a pause between successive accesses compared to a directly preceding or directly subsequent execution in the access scenario. In the case of a recognized variable write access, if the access size is known, writable memory space in the data memory is reserved at least to the extent of this access size. In the case of an unknown, namely variable, access size, on the other hand, writable memory space in the data memory is reserved at least to the extent of the largest size that has occurred for this access in the previous iterations. In this way, it can be ensured with a high degree of probability that, despite the variability, there is always enough reserved free memory space available for write accesses.

In some embodiments, the method further comprises:
(i) returning the access scenario received from the host to the host;

(ii) subsequently receiving verification information from the host indicating whether the returned access scenario corresponds to the access scenario previously transmitted by the host; and (iii) if this is the case, performing the optimization of the access scheme corresponding to the received access scenario, otherwise requesting a retransmission of the access scenario from the host.

This allows the host to check whether the memory controller has received and recognized the access scenario correctly, while the memory controller requests a repeat of the access scenario if a correction is needed, instead of performing the optimization based on a possibly erroneous or erroneously received/recognized access scenario. Overall, the reliability of the method can thus be increased.

In some embodiments the method further comprises (i) determining an updated access scenario which corresponds to the optimized access scheme and/or to one of the access schemes determined in the context of one of the aforementioned iterations; and (ii) at least partially transmitting this updated access scenario to the host. This opens up the possibility of not only making changes to the access scheme as part of the optimization, but also of making corresponding changes to the underlying access scenario. This is particularly relevant with regard to any changes in the chronological sequence of accesses defined in the access scenario, where, for example, the access scenario itself can also be shortened by advancing individual accesses in previous access pauses. Accordingly, the host can use the updated access scenario in the future, in particular in the context of the iterative execution of the method. It is particularly conceivable in this case that the decision as to whether the updated access scenario will be used in the future instead of the previous access scenario is left to the host. In this case, the controller makes an optimization suggestion that the host can accept or reject.

In some of these embodiments, an estimate for an increase in performance that can be achieved with the updated access scenario compared to the received access scenario is additionally created and transmitted to the host. In this way, the latter is informed of the performance increase that has been or can be achieved and can take this into account in the context of a future integration of the access scenario (in particular relative to other accesses lying outside of the access scenario) in the communication with the memory controller.

In particular, according to some embodiments in which an update of the access scenario is possible, the optimized access scheme can be determined depending on a received feedback from the host regarding the updated access scenario. In this way, the host retains the opportunity to participate in the definition of the optimized access scheme, possibly even a decisive role.

In some of these embodiments, while the access scheme is being optimized, the memory controller does not receive further host accesses to the data memory and/or may not implement such accesses. Ideally, the host is configured to concede the memory controller the time it needs to optimize before making further accesses. The required time can be agreed in particular a priori and defined, for example, by a parameter, or the host is informed via a corresponding signaling by the memory controller about when the optimization or an intermediate stage reached in the process has been reached.

A second aspect of the present solution relates to a memory controller, in particular a flash memory controller. It comprises one or more processors, non-transitory computer-readable memory and one or more programs stored in the memory which, when executed on the one or more processors, cause the memory controller to carry out the method according to the first aspect.

A third aspect of the present solution relates to a computer program or computer program product that includes instructions for causing a memory controller, in particular the memory controller according to the second aspect, to carry out the method according to the first aspect.

The computer program can be stored in particular on a non-volatile data carrier, in particular in the data memory or in a memory in the memory controller itself. The data carrier can also be in the form of an optical data carrier or a flash memory module. This can be advantageous if the computer program has to be handled as such independently of the memory controller. In another implementation, the computer program can be present as a file on a data processing unit, in particular on a server, and can be downloaded via a data connection, such as the Internet or a dedicated data connection, such as a proprietary or local network. In addition, the computer program can have a plurality of interacting individual program modules. In particular, the modules can be configured or at least used in such a way that they are executed in the sense of distributed computing on different devices (such as computers or processor units) that are geographically remote from one another and connected to one another by a data network.

The features and advantages explained with respect to the first aspect of the solution also apply correspondingly to the further aspects of the solution.

In the figures, the same reference numbers denote the same, similar or corresponding elements. Elements depicted in the figures are not necessarily represented to scale. Rather, the various elements shown in the figures are presented in such a way that their function and general purpose can be understood by those skilled in the art. Connections and couplings, shown in the figures, between functional units and elements of the computer system of FIG. 1 can also be implemented as an indirect connection or coupling, unless expressly stated otherwise. Unless specifically stated otherwise, functional units can be implemented in particular as hardware, software or a combination of hardware and software.

The exemplary computer system 100 illustrated in FIG. 1 with a memory system 102 has a memory controller 104 for controlling the memory system 102 and a data memory (or abbreviated: "memory") 106, controlled and in particular managed by it, which can have, in particular, a non-volatile memory (or non-volatile memory, NVM), such as a flash memory, for example of the NAND type. The data memory 106 can in particular have a plurality of memory media 106a and 106b, such as a plurality of semiconductor memory components. The memory media 106a, 106b can be accessed in particular via a common physical and/or logical address space. Insofar as the data memory, as in the present example, has a plurality of memory media 106a and 106b, this in particular also enables interleaving, whereby within the context of the method and in the access scenario, directly successive accesses which are to be combined in a sequential access succession can be defined in the corresponding access scheme in such a way that these successive accesses take place alternately on the memory media 106a, 106. The respective subsequent access then continues the interleaving from a physical memory location at which the interleaving of the previous access ends. Accordingly, if the last access was to the first memory medium 106a, the subsequent access is thus to the next memory medium 106b as part of the interleaving.

The memory system 102 is connected to a host 108, such as a computer with which the memory system 102 is associated, via a set of address lines AL, a set of data lines DL and a set of control lines CL. The memory controller 104 has a processor unit 104a and an internal memory 104b, typically of the embedded type (embedded memory), and is connected to the data memory 106 via an address bus AB, a data Bus DB and a control bus CB. Accordingly, the host 108 has indirect read and/or write access to the memory 3 via its connections AL, DL and CL to the memory controller 2, which in turn can directly access the memory 3 via the AB, DB and CB buses. Each of the sets of lines or buses AL, DL, CL, AB, DB and CD can be implemented using one or more individual communication lines. The lines AL, CL and the bus AB can also be missing.

A computer program, preferably as firmware, is stored in the internal memory 104b of the memory controller 104. When it is executed on the processor platform 104a of the memory controller 104, it is configured to execute the method according to the first aspect, in particular according to one of its embodiments described below with reference to FIG. 3 or FIG. 5.

The internal memory 104b can also be configured in such a way that it can be used as a buffer or register for a "read-ahead", so that the memory controller can read data from the data memory 106 in advance and buffer it in the internal memory 104b before the host 108 executes the actual request for access to this data, which has been previously loaded from the data memory, in the sense of a "read-ahead".

For the following explanation of embodiments of the method, reference is made to the computer system 100 and in particular to its memory controller 104, without this being to be construed as a limitation thereto.

Figure 2A:
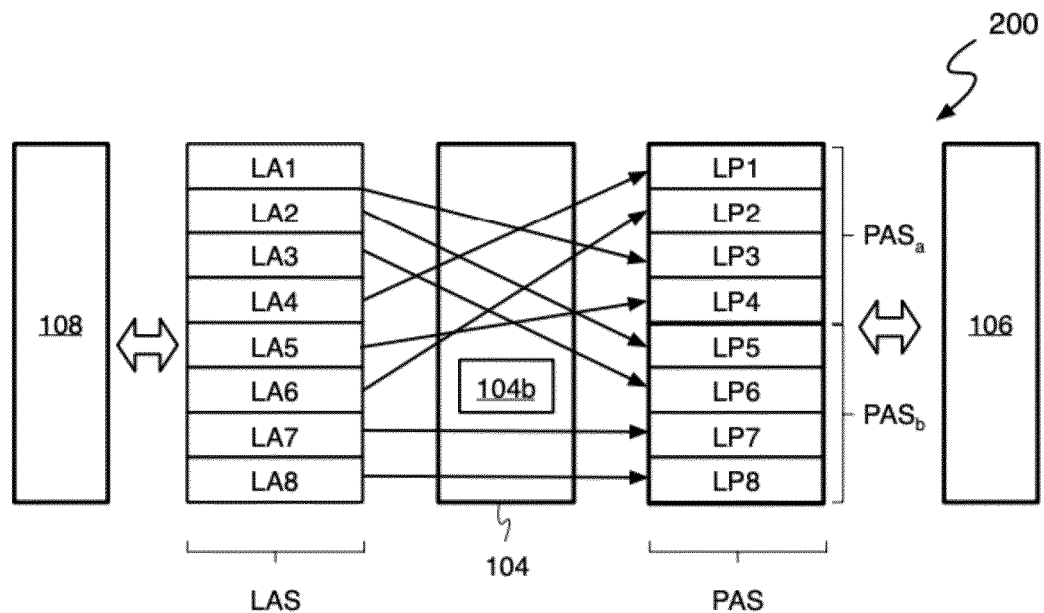
FIGS. 2A and 2B schematically show two exemplary address mappings between logical and physical memory addresses.

FIG. 2A schematically illustrates a first exemplary address mapping 200 between logical memory addresses LA1 to LA8 defined in a logical address space LAS and physical memory addresses PA1 to PA8 defined in a physical address space PAS. This address mapping, which takes place unidirectionally or bidirectionally between the two address spaces, can be carried out in particular by a memory controller, such as the memory controller 104 In the case of a plurality of memory media 106a, 106b in the data memory 106d, their respective physical address spaces $PAS_a$, $PAS_b$ can in particular be combined to form a continuous common physical address space PAS, as illustrated.

In the address mapping 200, the communication of memory addresses between the host 108 and the memory controller 104 occurs using the logical address space LAS. In contrast, the communication of memory addresses between the memory controller 104 and the data memory 106 takes place using the physical address space PAS. In FIG. 2, the mapping is symbolized by the different arrows between the two address spaces. While it is possible for logical addresses to coincide with the corresponding physical addresses (cf. LA7/LP/or LA8/LP8), this is usually not the case. If in the present example of FIG. 2, a read command from the host 108 requests reading of the memory contents of the address block with the sequentially consecutive logical memory addresses LA1 to LA6, this sequence would be resolved as part of the address mapping 200, so that in the physical address space PAS no sequential reading occurs, but rather differently large address jumps, even in different jump directions. Such an address mapping would therefore be disadvantageous from a performance point of view because it is slow on the physical side.

Figure 2B:
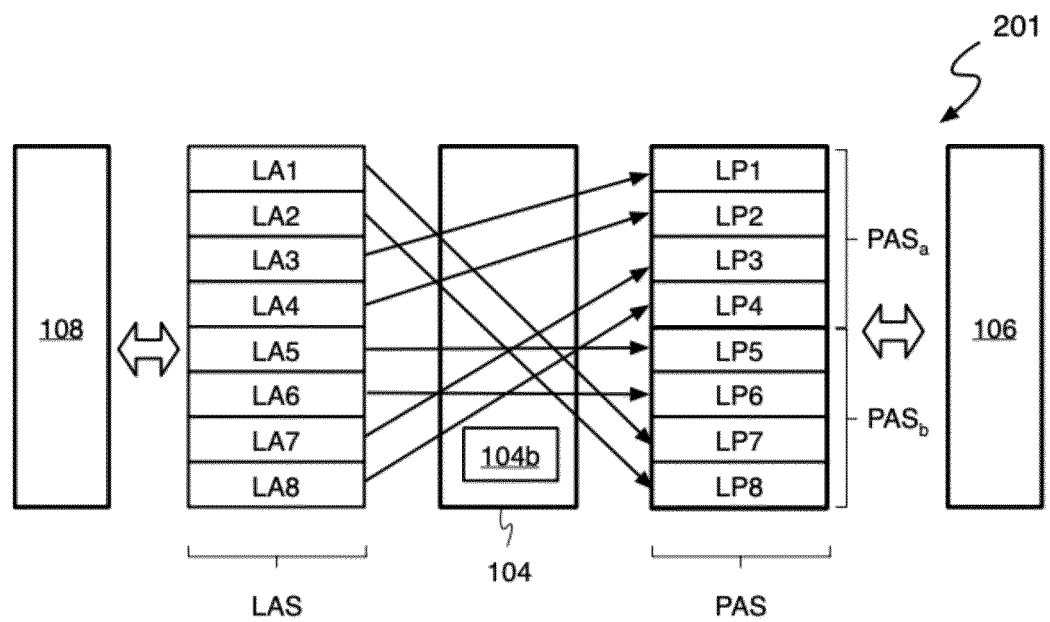

FIG. 2B, on the other hand, schematically illustrates a second exemplary address mapping 201 in which non-sequential memory accesses occurring in the logical address space LAS are "de-randomized", namely mapped at least partially into corresponding memory accesses which occur as sequential accesses in the physical address space PAS. In this way, a sped-up access sequence can be achieved on the physical side and the overall performance available for memory accesses by the host to the data memory 106 can thus be increased. For this purpose, an access scenario originating from the host 108 is considered as an example, in which first a sequential access to the logical addresses LA3 and LA4, then a further sequential access to the logical addresses LA7 and LA8, then a further sequential access to the logical addresses LA5 and LA6 and finally a further sequential access to the logical addresses LA1 and LA2 takes place. Several jumps in different jump directions therefore occur in the logical address space LAS. In the physical address space PAS, however, the address mapping 201 results overall in a corresponding access sequence, in which the address areas of the aforementioned accesses follow one another sequentially and can therefore be mapped with high performance on the physical level.

Figure 3:
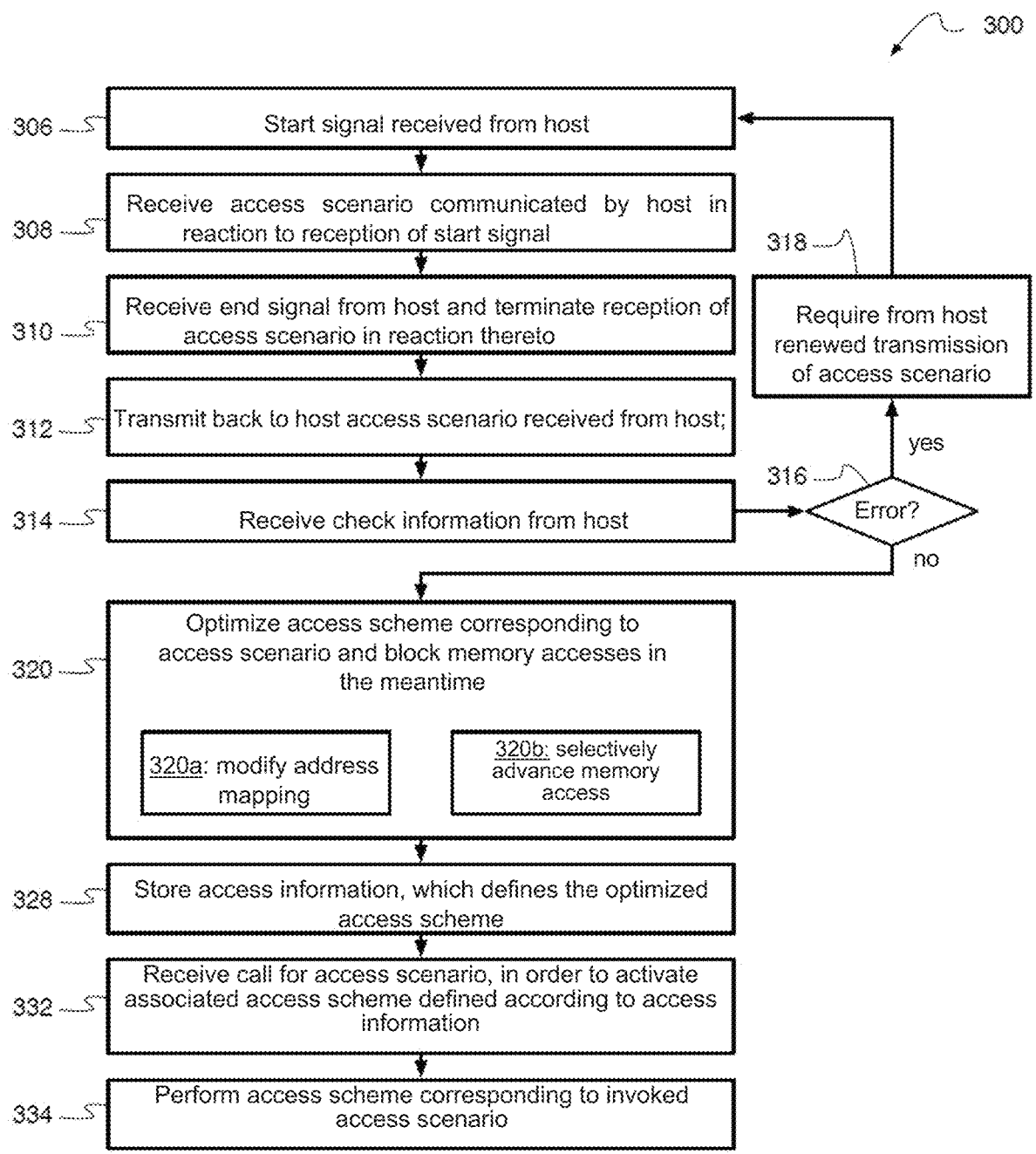
FIG. 3 shows a flowchart to illustrate a first exemplary embodiment of the method for optimizing an access scheme for memory accesses.

FIG. 3 uses a flow chart to show a first exemplary embodiment 300 of the method for optimizing an access scheme for memory accesses. The method can be executed in particular by a memory controller, for example by memory controller 104 of computer system 100, as described below.

In the following, reference to a "step" or "steps" of the method does not mean that the related action must necessarily take place in a single coherent process. Rather, it is also possible that a "step" is composed of several individual operations in the sense of a process and thus corresponds to a sub-process of the method.

In the method 300, a start signal transmitted by the host 108 is first received in a step 306, which indicates that the host 108 will subsequently transmit an access scenario. The transmission can thus take place in particular in such a way that the host 108 actually executes the access scenario by successively transmitting the access requests defined therein on the basis of logical memory addresses LA from address space LAS to the memory controller 104. The access scenario is received in step 308 by the memory controller 104. After the access scenario has been transmitted completely, the host 108 transmits an end signal, which is received by the memory controller 104 in step 310 and signals the end of the transmission to the memory controller 104.

In particular, it can be provided as part of the method that the memory controller 106 transmits the received access scenario back to the host 108 in a suitable manner (step 312) in order to enable it to check whether the previous transmission of the access scenario to the memory controller 106 was correct or incorrect. The host 108 then transmits the check result to the memory controller 106 so that it can receive and evaluate the check result (steps 314 and 316). In the event of an error (316—yes), a renewed transmission of the access scenario to the memory controller 106 can then be requested (step 318). Otherwise (316—no), the method can be continued without requesting a retransmission of the access scenario.

Figure 4:
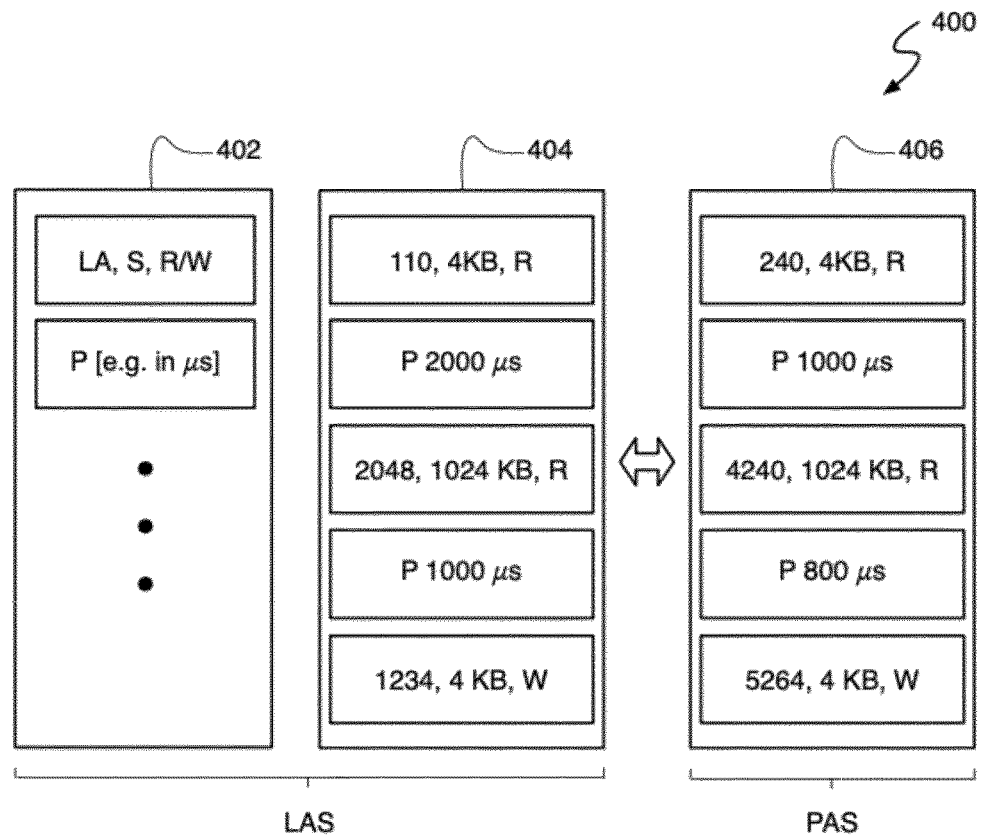
FIG. 4 shows an exemplary representation of an access scenario defined on the basis of logical memory addresses and its mapping into an access scheme corresponding thereto and defined on physical memory addresses.

An exemplary access scenario is illustrated in abstract form 402 and as a specific example 404 in FIG. 4 on its left-hand side. Each access of the access scenario 402/404 is specified by a logical memory address LA, an access size S (e.g., a number of bytes or kilobytes (KB)) and an identification of an access type (R=read (Read), W=write (Write)). In addition, in the access scenario 402/404, in particular, pauses P can also be defined between successive accesses, which can each be specified in particular on the basis of their respective pause length (such as in microseconds).

If a correctly communicated access scenario is present at the memory controller 104, it can define and optimize a corresponding access scheme based on the physical address space. For this purpose, in particular the address mapping can be redefined or modified on the basis of a previous address mapping that has already been specified in advance for the access scenario (step 320a). In particular, the resulting optimized access scheme can be de-randomized to a higher degree by increasing the proportion of sequential accesses, as has already been explained above by way of example with reference to FIG. 2.

In addition or alternatively, the optimization can also include a time shift 320b, in particular an advancement of accesses in the context of the access scheme. In particular, this can be done in such a way that a next physical access according to the optimized access scheme already begins at a point in time in the course of the access sequence, for which a pause is still provided in the access scenario.

Both optimization paths are also illustrated in combination in FIG. 4, where the specific access scenario 404 is implemented by the memory controller 104 in an optimized access scheme 406 in such a way that this defines both a de-randomization in the context of address mapping and a shortening of pauses P and thus a temporal advancement of physical accesses.

It can also be provided within the scope of the method 300 that further (attempted) memory accesses by the host 108 are not received during the optimization process 320. In particular, this can be done in such a way that the memory controller 104 is put during this time into an operating mode in which it is not ready to receive at all, or by not processing or at least temporarily pausing received access requests from the host 108, until the optimization 320 is completed.

As part of the method 300, during or after the optimization 320, access information is stored 328, which defines the optimized access scheme. The access information can be stored in particular in the internal memory 104b of the memory controller itself or in the data memory 106. Storing takes place in such a way that the access scheme as such can be easily called up in order to activate it. For example, an identifier can be assigned to the access scheme, by means of which identifier it can be selectively called up at its memory location. This initially ends the process of defining an optimized access scheme.

If the host 108 subsequently wants to execute the underlying access scenario 404 again, for example as part of a boot process, then it can transmit a corresponding call to the memory controller 104, where the call is received (step 332) and the access scheme 406 associated with the access scenario 404 specified in the call can be retrieved from its memory location and thereby activated for execution 334 by the memory controller 104.

Figure 5:
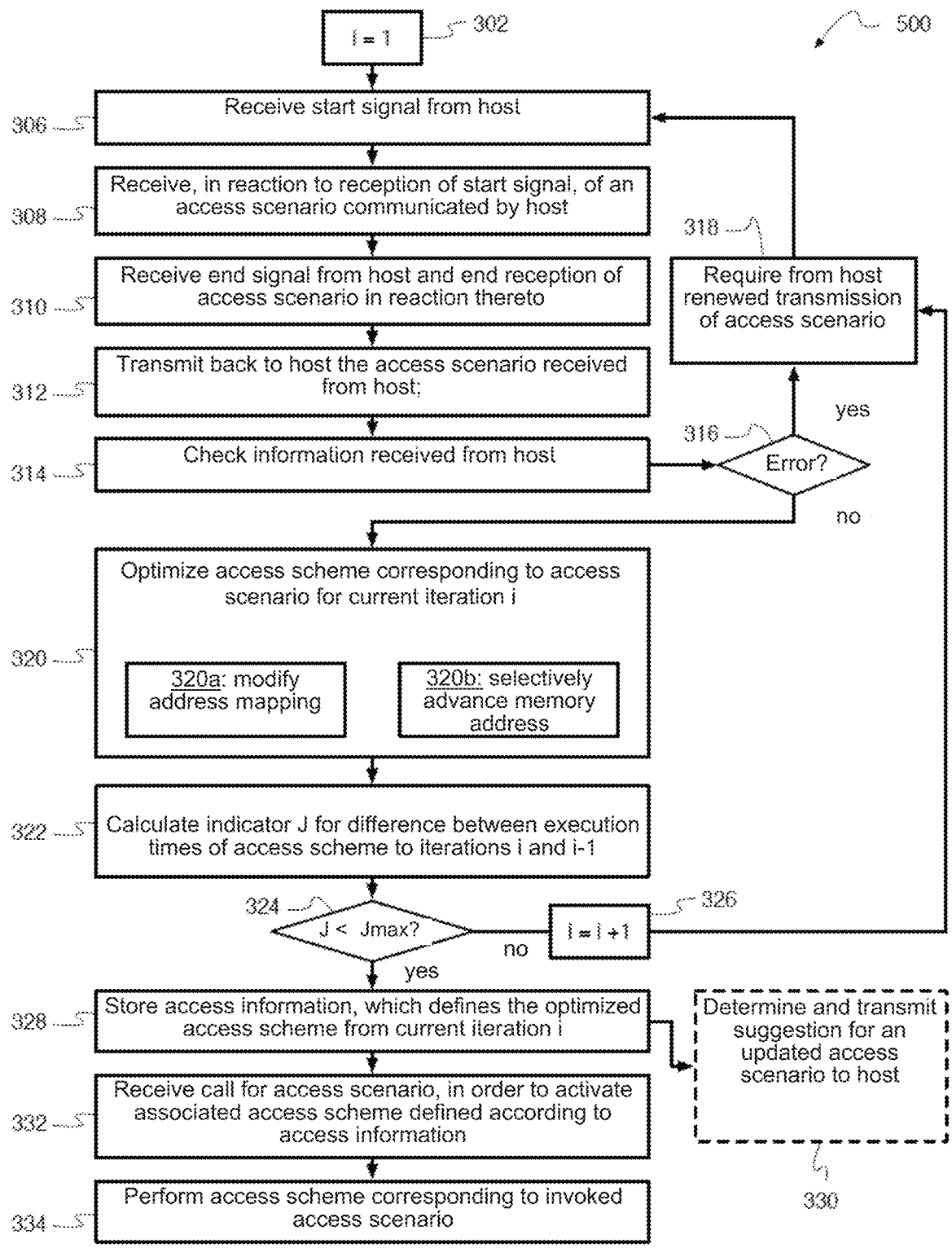
FIG. 5 shows a flowchart to illustrate a second exemplary embodiment of the method for optimizing an access scheme for memory accesses.

FIG. 5 uses a flow chart to illustrate a second exemplary embodiment 500 of the method for optimizing an access scheme for memory accesses. The method can also be executed in particular by a memory controller, for example by memory controller 104 of computer system 100.

Method 500 represents an extension of method 300, wherein the same method steps are identified by the same reference symbols in both methods and are not described again in detail below. Instead, the explanations given above for method 300 apply accordingly.

In contrast to method 300, method 500 is designed iteratively with regard to the optimization of the access scheme. The optimization is therefore carried out here regularly using a plurality of successive iteration runs (iterations), in each of which an optimization process is carried out in step 320 proceeding from the previous status of the access scheme. For example, a running index i, which can be initially initialized in step 302, can be used for indexing consecutive iterations.

If the optimization step 320 has taken place in a current iteration i, an execution time required therefor can be determined for the current defined access scheme, such as by summing up the time periods required for the individual accesses and pauses defined in the current access scheme.

Then, in step 322, a difference between the execution time of the current access scheme of iteration i and the execution time of the previous access scheme of iteration i−1 can be determined and represented by an indicator J.

The indicator J can then be compared to a predetermined reference threshold $J_{max}$ (test 324), which serves as an exit criterion for the iterative process. If J falls below the reference threshold $J_{max}$ (324—yes), then the iterative process has converged sufficiently and is ended so that one may proceed to step 328. Otherwise (324—no) the iterative process is continued, for which purpose the running index i is also incremented in step 326 and in step 318 a renewed transmission of the access scenario from the host 108 is requested.

Optionally, it can also be provided that in a further step 330 the current access scheme, which resulted from the last iteration executed, is transmitted to the host. In addition or alternatively, the memory controller 104 can also transmit to the host 108 a suggested improvement for the access scenario which was determined during the determination of the optimized access scheme. This enables the host 108 to adapt the underlying access scenario itself in the sense of an optimization.

A simple explanatory example is provided in the following: The original access scenario transmitted to the memory controller could be something like the following:
1. Switching on the data memory (Power on)
2. Pause
3. Read access, 600 KB, scattered in the logical address space LAS
4. Pause
5. Read access, 600 KB, scattered in the logical address space LAS
6. Pause
7. Read access, 600 KB, scattered in the logical address space LAS The memory controller 104 can then, as described in particular with reference to methods 300 and 500, determine an optimized access scenario.

In this case, however, it can happen that the memory controller 104 determines that the access scenario itself can be optimized in view of the possibilities and limitations of the memory controller 104. In the present example, the memory controller 104 could determine, for example, that the access size S of the read accesses is respectively greater than the size of the internal memory 104b, which is limited to 500 KB, so that the memory controller 104 always has to insert a short pause after 500 KB in order to process the accesses, to read further requested data from the data memory 106. The controller can therefore transmit to the host in step 330 the correspondingly adapted access scheme with accesses, the access size of which does not exceed the size of the internal memory 104b, or appropriate proposals for optimizing the underlying access scenario previously received from the host 108 in step 308 to the host 108.

In this way, for example, the following modified access scenario could be suggested or determined by the host 108 itself on the basis of the information transmitted in step 330

1. Switching on the data memory (Power on)
2. Pause
3. Read access, 500 KB, scattered in the logical address space LAS
4. Pause
5. Read access, 500 KB, scattered in the logical address space LAS
6. Pause
7. Read access, 500 KB, scattered in the logical address space LAS
8. Read access, 300 KB, scattered in the logical address space LAS Although the same addresses appear here in the same order, the changes in the access sizes result in an optimized access scenario which would be easier for the memory controller to process than the original access scenario. The host 108 could then accept or reject this suggestion and instead omit the optimization or achieve it in another way, for example by creating itself an optimized access scenario based on the information transmitted.

Figure 6:
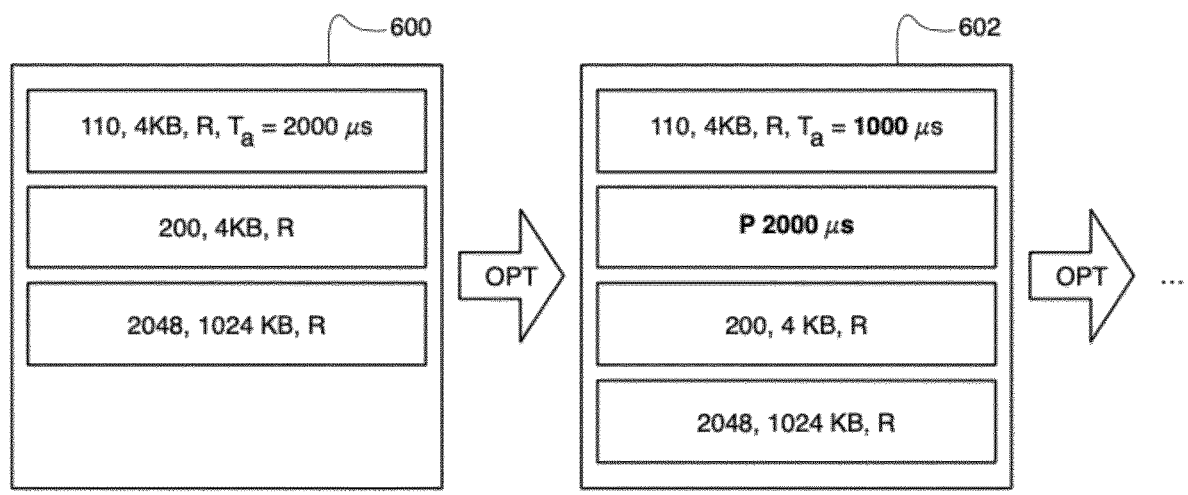
FIG. 6 shows an exemplary representation of an optimization of an access scenario, in particular according to the method of FIG. 5.

A simple, further example for such an optimization of the access scenario is illustrated in FIG. 6. Here, the original access scenario 600 is further optimized in one or more optimization iterations, wherein in particular, in this case, access times $T_a$ can be varied (as illustrated), and pauses P can be inserted (as illustrated), eliminated or changed.

LIST OF REFERENCE NUMERALS

100 computer system
102 memory system
104 memory controller
104a processor unit
104b internal memory of the memory controller 104
106 data memory
106a first memory medium
106b second memory medium
108 host
200 first example of address mapping
201 second example of address mapping
300 method, first embodiment
302-334 method steps or sub-processes of method 300 or 500
400 definition of an access scheme based on an access scenario
402 access scenario, abstract
404 access scenario, specific
406 access scheme
500 method, second embodiment (iterative)
600 original access scenario
602 updated (optimized) access scenario
AB address bus
DB data bus
CB control bus
AL address line(s)
DL data line(s)
CL control line(s)
J Indicator of the difference in execution times of two access schemes
$J_{max}$ reference threshold
LA, LA1-LA8 logical memory addresses
LP, LP1-LP8 physical memory addresses
LAS logical address space
PAS physical address space
$PAS_a$ physical (sub-) address space of the first memory medium 106a
$PAS_a$ physical (sub-) address space of the first memory medium 106b
P pause
R read access
S access size
$T_a$ access time
W write access

What is claimed is:

1. A method for optimizing an access scheme for memory accesses of a host to a data memory managed by a memory controller, with one or more memory media, wherein the method is carried out by the memory controller and comprises:

receiving an access scenario communicated by the host, wherein the scenario defines a specific sequence of accesses to be performed by the memory controller to the data memory and an associated logical address space (LAS) is specified in each case, which, in the context of an address mapping, is mapped to a corresponding physical memory area of the data memory, which is defined in the access scheme, and wherein the access scheme defines one or more physical write accesses and the optimization comprises a modification of the address mapping in such a way that for all the one or more physical write accesses a sufficiently large writable memory space is reserved for their later execution according to the optimized access scheme;

optimizing an access scheme, corresponding to the received access scenario, which defines a specific sequence of physical memory accesses to the data memory to be executed by the memory controller to implement the access scenario, wherein said optimizing shortens a total access time for the access scenario including modifying at least one of the memory accesses by shifting a respective physical memory area to be addressed thereby in relation to one or more of an address mapping and a temporal advancement of the respective memory access; and saving access information defining the optimized access scheme, so that the optimized access scheme subsequently can be activated by a call in such a way that the optimized access scheme is automatically executed in reaction to the call, in accordance with the stored access information.

2. The method of claim 1, wherein optimization of the access scheme comprises modifying the address mapping in such a way that for two or more consecutive accesses in the access scenario, their respective corresponding physical memory areas are combined in such a way that they can be addressed contiguously in a subsequent activation of the optimized access scheme by a sequential memory access.

3. The method of claim 2, wherein combining the physical memory areas takes place in relation to two or more accesses directly consecutive in the access scenario, wherein respective access sizes of corresponding physical memory areas of the two or more accesses is less than a minimum access size, while a sum of the respective access sizes corresponds at least to the minimum access size.

4. The method of claim 2, wherein the data memory has at least two memory media, and the accesses directly successive in the access scenario and to be combined in the access scheme are alternatively defined as part of an interleaving between the memory media, wherein the combining of the physical memory areas as part of the optimization of the access scheme is carried out in such a way that a subsequent access continues interleaving from a physical memory location where the interleaving of the previous access ends.

5. The method of claim 1, wherein the access scheme defines two or more physical write accesses and said optimizing an access scheme comprises modifying the address mapping in such a way that for at least two of the write accesses their associated physical memory areas are placed in the same memory unit of the data memory, which are contiguously erasable within the scope of a single erasing access.

6. The method of claim 1, wherein the optimization includes a temporal advance of a second access defined in the access scenario, such that, within the optimized access scheme, the start of the physical memory access corresponding to the second access is brought forward to an execution time for which, in the access scenario, a pause is provided between a first access preceding the second access and the second access.

7. The method of claim 1, further comprising, subsequent to storing the access information, activating the access scheme in response to a call of the access scenario to execute the access scheme as defined by the access information.

8. The method of claim 7, wherein the activating takes place in response to one or more of:
a call of the access scenario received from the host; and
automatically as part of a startup of the memory controller.

9. The method of claim 1, wherein said receiving an access scenario takes place in response to receiving a start signal received from the host.

10. The method of claim 1, wherein said receiving an access scenario takes place in response to receiving an end signal received from the host.

11. The method of claim 1, wherein the method is defined as an iterative method such that:
in a first iteration, the access scenario is received, and a first access scheme corresponding thereto and an execution time for its execution are determined; and
in each subsequent iteration:
the access scenario is received again;
the optimization is performed based on a previous access scheme determined in a previous iteration to determine a current access scheme;
an indicator is determined for a difference between the execution time of the current access scheme and the execution time for the previous access scheme;
the indicator is compared to a defined minimum requirement; and
if the comparison shows that the difference specified by the indicator does not yet meet the minimum requirement, the method proceeds to a next iteration,
otherwise, the current access scheme is set as the optimized access scheme and saved based on the access information.

12. The method of claim 11, wherein, for each iteration, the previous access scheme is executed as a starting point of the optimization running in the iteration and its execution time is measured.

13. The method of claim 12, wherein:
variable accesses in the access scenario are recognized for each iteration when executed multiple times, wherein the variable accesses change while maintaining the same position within the access scenario over different iterations with regard to one or more of their access address, their access size and a length of a pause between successive accesses compared to a directly preceding or directly subsequent execution in the access scenario; and
in case of a recognized variable write access:
if the access size is known, writable memory space in the data memory is reserved at least to the extent of the access size, and
if the access size is unknown, writable memory space in the data memory is reserved at least to the extent of the largest size that has occurred for this access in the previous iterations.

14. The method of claim 1, further comprising:
retransmitting the access scenario to the host;
subsequently receiving check information from the host, which indicates whether the returned access scenario corresponds to the access scenario; and
if the returned access scenario corresponds to the access scenario, performing the optimization of the access scheme corresponding to the received access scenario, otherwise requesting a retransmission of the access scenario from the host.

15. The method of claim 1, further comprising:
determining an updated access scenario which corresponds to the optimized access scheme; and
communicating the updated access scenario, at least in part, to the host.

16. The method of claim 15, wherein, additionally, an estimate for an increase in performance that can be achieved with the updated access scenario compared to the received access scenario is created and transmitted to the host.

17. The method of claim 15, wherein the optimized access scheme is determined depending on a received feedback from the host to the updated access scenario.

18. The method of claim 1, wherein the memory controller neither receives nor implements ne further accesses from the host to the data memory while the access scheme is being optimized.

19. A memory controller comprising:
one or more processors; and
a non-volatile computer-readable memory having stored therein instructions, which, when executed on the one or more processors, cause the memory controller to perform a method comprising:
receiving an access scenario communicated by the host, wherein the scenario defines a specific sequence of accesses to be performed by the memory controller to the data memory and an associated logical address space (LAS) is specified in each case, which, in the context of an address mapping, is mapped to a corresponding physical memory area of the data memory, which is defined in the access scheme, and wherein the access scheme defines one or more physical write accesses and the optimization comprises a modification of the address mapping in such a way that for all the one or more physical write accesses a sufficiently large writable memory space is reserved for their later execution according to the optimized access scheme;
optimizing an access scheme, corresponding to the received access scenario, which defines a specific sequence of physical memory accesses to the data memory to be executed by the memory controller to implement the access scenario, wherein said optimizing shortens a total access time for the access scenario including modifying at least one of the memory accesses by shifting a respective physical memory area to be addressed thereby in relation to one or more of an address mapping and a temporal advancement of the respective memory access; and saving access information defining the optimized access scheme, so that the optimized access scheme subsequently can be activated by a call in such a way that the optimized access scheme it is automatically executed in reaction to the call, in accordance with the stored access information.

20. The memory controller of claim 19, wherein optimization of the access scheme comprises modifying the address mapping in such a way that for two or more consecutive accesses in the access scenario, their respective corresponding physical memory areas are combined in such a way that they can be addressed contiguously in a subsequent activation of the optimized access scheme by a sequential memory access.

21. The memory controller of claim 20, wherein combining the physical memory areas takes place in relation to two or more accesses directly consecutive in the access scenario, wherein respective access sizes of corresponding physical memory areas of the two or more accesses is less than a minimum access size, while a sum of the respective access sizes corresponds at least to the minimum access size.

22. The memory controller of claim 20, wherein the data memory has at least two memory media, and the accesses directly successive in the access scenario and to be combined in the access scheme are alternatively defined as part of an interleaving between the memory media, wherein the combining of the physical memory areas as part of the optimization of the access scheme is carried out in such a way that a subsequent access continues interleaving from a physical memory location where the interleaving of the previous access ends.

23. The memory controller of claim 19, wherein the access scheme defines two or more physical write accesses and said optimizing an access scheme comprises modifying the address mapping in such a way that for at least two of the write accesses their associated physical memory areas are placed in the same memory unit of the data memory, which are contiguously erasable within the scope of a single erasing access.

24. The memory controller of claim 19, wherein the optimization includes a temporal advance of a second access defined in the access scenario, such that, within the optimized access scheme, the start of the physical memory access corresponding to the second access is brought forward to an execution time for which, in the access scenario, a pause is provided between a first access preceding the second access and the second access.

25. The memory controller of claim 19, further comprising, subsequent to storing the access information, activating the access scheme in response to a call of the access scenario to execute the access scheme as defined by the access information.

26. The memory controller of claim 25, wherein the activating takes place in response to one or more of:
a call of the access scenario received from the host; and
automatically as part of a startup of the memory controller.

27. The memory controller of claim 19, wherein said receiving an access scenario takes place in response to receiving a start signal received from the host.

28. The memory controller of claim 19, wherein said receiving an access scenario takes place in response to receiving an end signal received from the host.

29. The memory controller of claim 19, wherein the method is defined as an iterative method such that:
in a first iteration, the access scenario is received, and a first access scheme corresponding thereto and an execution time for its execution are determined; and
in each subsequent iteration:
the access scenario is received again;
the optimization is performed based on a previous access scheme determined in a previous iteration to determine a current access scheme;
an indicator is determined for a difference between the execution time of the current access scheme and the execution time for the previous access scheme;
the indicator is compared to a defined minimum requirement; and
if the comparison shows that the difference specified by the indicator does not yet meet the minimum requirement, the method proceeds to a next iteration,
otherwise, the current access scheme is set as the optimized access scheme and saved based on the access information.

30. The memory controller of claim 29, wherein, for each iteration, the previous access scheme is executed as a starting point of the optimization running in the iteration and its execution time is measured.

31. The method of claim 30, wherein:
variable accesses in the access scenario are recognized for each iteration when executed multiple times, wherein the variable accesses change while maintaining the same position within the access scenario over different iterations with regard to one or more of their access address, their access size and a length of a pause between successive accesses compared to a directly preceding or directly subsequent execution in the access scenario; and
in case of a recognized variable write access: if the access size is known, writable memory space in the data memory is reserved at least to the extent of the access size, and
if the access size is unknown, writable memory space in the data memory is reserved at least to the extent of the largest size that has occurred for this access in the previous iterations.

32. The memory controller of claim 19, further comprising:
retransmitting the access scenario to the host; subsequently receiving check information from the host, which indicates whether the returned access scenario corresponds to the access scenario; and
if the returned access scenario corresponds to the access scenario, performing the optimization of the access scheme corresponding to the received access scenario,
otherwise requesting a retransmission of the access scenario from the host.

33. The memory controller of claim 19, further comprising:
determining an updated access scenario which corresponds to the optimized access scheme; and
communicating the updated access scenario, at least in part, to the host.

34. The memory controller of claim 33, wherein, additionally, an estimate for an increase in performance that can be achieved with the updated access scenario compared to the received access scenario is created and transmitted to the host.

35. The memory controller of claim 33, wherein the optimized access scheme is determined depending on a received feedback from the host to the updated access scenario.

36. The memory controller of claim 19, wherein the memory controller neither receives nor implements ne further accesses from the host to the data memory while the access scheme is being optimized.

* * * * *